Aug. 19, 1952     G. E. DATH     2,607,583
FRICTION SHOCK ABSORBER FOR RAILWAY CAR TRUCKS
Filed Nov. 23, 1949     2 SHEETS—SHEET 1
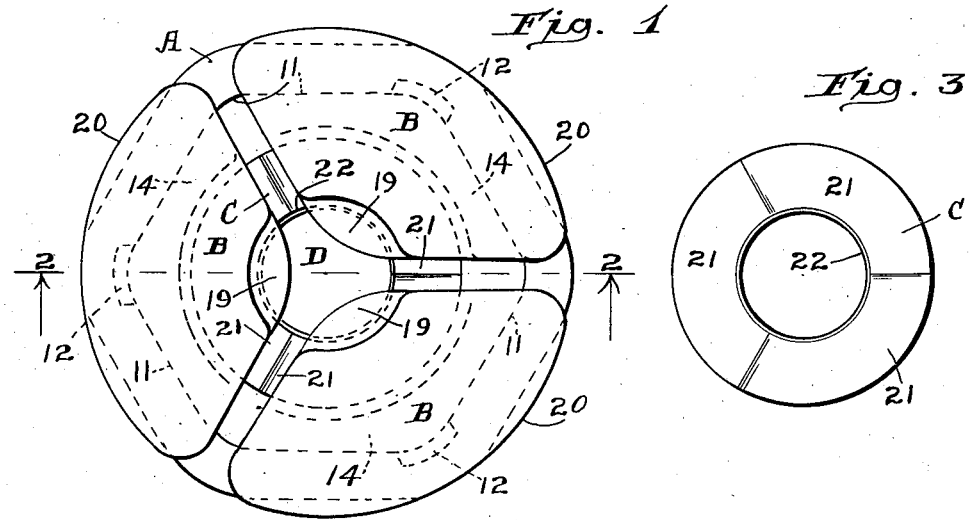
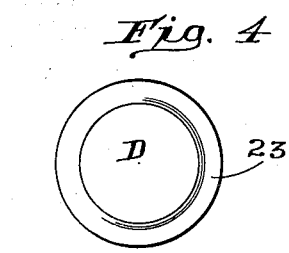
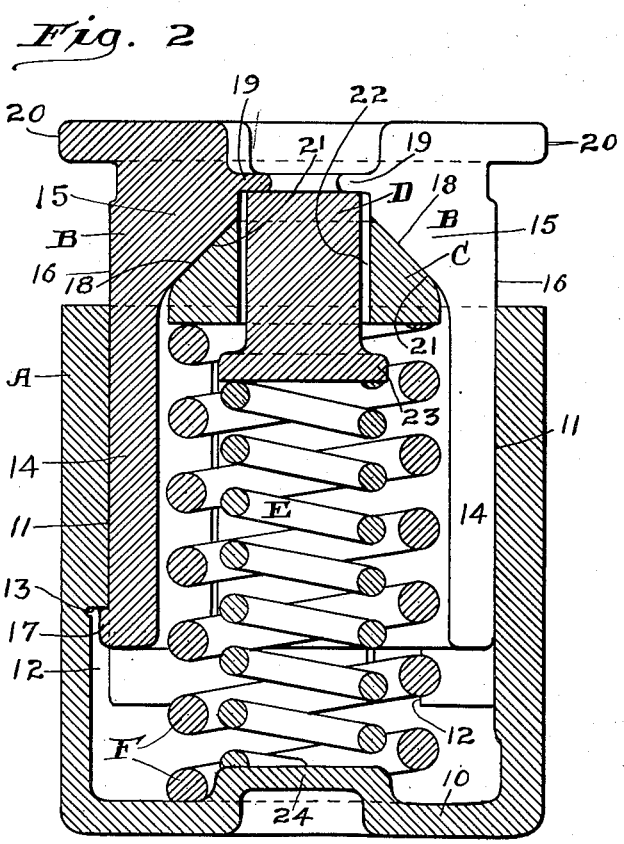
Inventor:
George E. Dath
By Henry Fuchs
Atty.

Inventor:
George E. Dath.
By Henry Fuchs
Atty

Patented Aug. 19, 1952

2,607,583

UNITED STATES PATENT OFFICE 2,607,583

FRICTION SHOCK ABSORBER FOR RAILWAY CAR TRUCKS

George E. Dath, Mokena, Ill., assignor to W. H. Miner, Inc., Chicago, Ill., a corporation of Delaware Application November 23, 1949, Serial No. 128,995

5 Claims. (Cl. 267—9)

This invention relates to improvements in friction shock absorbers for snubbing or dampening the action of railway car truck springs.

One object of the invention is to provide a friction shock absorber of the character indicated, comprising a friction casing, friction shoes slidingly telescoped within the casing, a spring follower having wedging engagement with the shoes, a spring within the casing yieldingly opposing inward movement of the spring follower, and an additional spring yieldingly opposing inward movement of the shoes only and acting to force the shoes outwardly away from the spring follower to break the wedging contact between the former and the latter to facilitate release of the mechanism.

A more specific object of the invention is to provide in a mechanism as set forth in the preceding paragraph, a release plunger engaging flanges on the shoes and transmitting the actuating force from the spring which cooperates with the shoes.

Other objects of the invention will more clearly appear from the description and claims hereinafter following.

Figure 5:
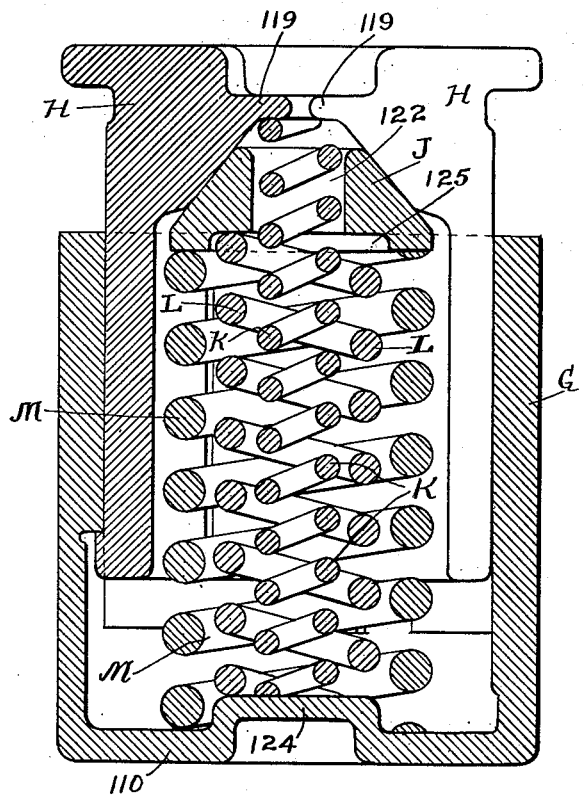
Figure 6:
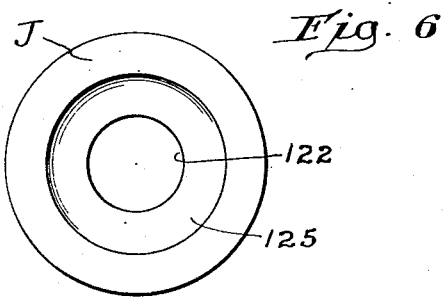

In the accompanying drawings forming a part of this specification, Figure 1 is a top plan view of my improved friction shock absorber. Figure 2 is a transverse, vertical sectional view, corresponding substantially to the line 2—2 of Figure 1. Figures 3 and 4 are top plan views, respectively, of the spring follower and releasing plunger of my improved shock absorber. Figure 5 is a view similar to Figure 2, illustrating another embodiment of the invention. Figure 6 is a bottom plan view of the spring follower shown in Figure 5.

Referring first to the embodiment of the invention illustrated in Figures 1 to 4 inclusive, my improved friction shock absorber comprises broadly a friction casing A, three friction shoes B—B—B, a spring follower C, a releasing plunger D, and springs E and F.

The casing A is in the form of a tubular member of hexagonal, transverse cross section, open at its upper end and closed at its bottom end by a transverse wall 10. The interior of the casing presents three lengthwise extending friction surfaces 11 of V-shaped, transverse cross section, each V-shaped surface 11 being formed by two adjacent walls of the hexagonal casing. At alternate corners of the casing, the interior side walls are vertically slotted at their lower ends, as indicated at 12. The transverse walls at the upper ends of the slots 12 provide stop shoulders 13 for a purpose hereinafter pointed out.

The friction shoes B are three in number and are arranged symmetrically about the vertical central axis of the casing A, in sliding engagement with the side walls of said casing. Each shoe B comprises an elongated, platelike section 14 of V-shaped, transverse cross section, and an inwardly enlarged head 15 at the top end of the plate section 14. The plate section 14 presents a lengthwise extending friction surface 16 on its outer side of V-shaped, transverse cross section engaged with one of the V-shaped friction surfaces of the casing. At its lower end, the platelike section 14 of each shoe B is provided with a laterally outwardly projecting stop lug 17, which is located at the corner presented by the angularly diverging portions of the V-shaped surface of each shoe, and is engaged in the corresponding slot 12 of the casing in back of the shoulder 13 at the upper end of said slot. As will be evident, engagement of the stop lug 17 of each shoe, with the corresponding shoulder 13 of the casing, positively limits outward movement of said shoe.

The laterally inwardly projecting head 15 of each shoe presents a flat wedge face 18 on its underneath side. The wedge faces 18—18—18 of the three shoes diverge downwardly, as clearly shown in Figure 2. Each shoe has an inwardly projecting, horizontal lip or flange 19 on the inner side of its head, located above the wedge face of said shoe, and said shoe is cut out on its inner side above said flange, as shown in Figures 1 and 2, to provide a seat for the usual spring centering projection on the top follower plate of a cluster of railway car truck springs. Each shoe further has a laterally outwardly projecting, horizontal flange 20 at its upper end overhanging the upper end of the casing A and engageable therewith to limit compression of the mechanism.

The spring follower C is in the form of a ringlike block, having three upwardly converging, flat wedge faces 21—21—21 at the upper side thereof, correspondingly inclined to and engaged with the wedge faces 18—18—18 of the three shoes. The block C is provided with an axial bore 22, within which the plunger D is loosely slidable.

The plunger D is in the form of a solid cylinder, provided with a peripheral flange 23 at its lower end. The plunger D is slidingly telescoped within the spring follower C and has its top end abutting the underneath sides of the flanges 19—19—19 of the three shoes.

The springs E and F are arranged within the casing A, between the shoes B—B—B. Each of these springs is in the form of a helical coil, the spring F being heavier than the spring E and surrounding the latter. The inner spring E has its upper end bearing on the bottom end of the plunger D and its lower end bearing on an upstanding hollow boss 24 on the wall 10 of the casing A. The outer spring F has its top end bearing on the bottom side of the follower ring C and its bottom end surrounding the boss 24 and bearing directly on the bottom wall 10 of the casing A. The springs E and F are preferably under a predetermined amount of initial compression in the assembled condition of the mechanism. The hollow boss 24 on the bottom wall of the casing provides a seat which is adapted to accommodate the usual spring centering projection of the bottom spring follower plate of a cluster of truck springs.

My improved shock absorber preferably replaces one or more of the spring units of a truck spring cluster of a railway car, being interposed between the top and bottom spring plates of said cluster.

The operation of my improved shock absorber is as follows: Upon the spring cluster of the truck of a railway car being compressed between the spring follower plates of the cluster, the shoes B—B—B are forced downwardly with respect to the casing A against the spring resisted ring C and the spring resisted plunger D. Due to wedging engagement between the spring follower ring C and the shoes B—B—B, the latter are spread apart into tight frictional engagement with the friction surfaces of the casing A. Frictional resistance is thus provided between the shoes B—B—B and the casing A during sliding movement of the shoes. The frictional resistance thus provided is augmented by the resistance afforded by the inner spring E, which directly opposes inward movement of the shoes through the medium of the interposed plunger D. The desired resistance is thus provided to properly snub the action of the truck springs.

Upon recoil of the truck springs and upward movement of the top spring follower plate of the truck spring cluster, the springs E and F return all of the parts to the normal full release positions shown in Figure 2, the inner spring E, through the plunger D, acting directly on the shoes B—B—B to force the shoes away from the follower ring C and break the contact between the engaging wedge faces of said shoes and follower ring, thereby assuring instantaneous release of the mechanism. Outward movement of the shoes is positively limited by engagement of the lugs 17 thereof with the shoulders 13 of the casing.

Referring next to the embodiment of the invention illustrated in Figures 5 and 6, the construction is substantially the same as that shown in Figures 1 to 4 inclusive, with the exception that the releasing plunger is omitted, and that an inner coil spring is added, which extends through the spring follower and has direct shouldered engagement with the shoes.

The improved shock absorber, as shown in Figures 5 and 6, comprises a friction casing G, three friction shoes H—H—H, and a spring follower ring J, similar to the casing A, the shoes B—B—B, and the spring follower C, hereinbefore described, and operating in a similar manner, and springs K, L, and M.

Each spring K, L, and M is in the form of a helical coil, the spring K being innermost, the spring L surrounding the spring K, and the spring M surrounding the spring L. The spring M has its top and bottom ends bearing, respectively, on the underneath side of the ring J and the bottom wall 110 of the casing G, the bottom end surrounding the hollow boss 124 upstanding from said wall 110. The spring L has its bottom end seated on the boss 124 and its top end buttressed against the follower ring J, said top end being engaged in an annular seat 125 in said ring. The spring K has its bottom end seated on the boss 124 and its upper end portion extending through the bore 122 of the ring J, with its top end engaged with the flanges or lips 119—119—119 of the shoes H—H—H.

The springs K, L, and M are preferably under a predetermined amount of initial compression in the assembled condition of the mechanism, the inner spring K acting directly on the shoes to oppose inward movement of the same inwardly of the casing, and force said shoes away from the ring J to break the contact between the engaging wedge faces of said shoes and the follower ring J in the releasing action of the mechanism.

I claim:

1. In a friction shock absorber, the combination with a friction casing; of a plurality of friction shoes slidingly telescoped within the casing; a spring follower having wedge faces in wedging engagement with the shoes, said spring follower having an opening therethrough; and inner and outer yielding means within said casing, said outer yielding means being buttressed against said spring follower to yieldingly oppose inward movement of the latter, said inner yielding means having a portion thereof extending through the opening of said spring follower and into engagement with said shoes.

2. In a friction shock absorber, the combination with a friction casing; of a plurality of friction shoes slidingly telescoped within the casing; a spring follower ring in wedging engagement with said shoes; a spring within the casing yieldingly opposing inward movement of the shoes; a second spring within the casing buttressed against said spring follower ring for yieldingly opposing inward movement of the latter; and a pressure transmitting member extending through said spring follower ring and bearing at opposite ends on said shoes and first named spring for transmitting pressure from the latter to said shoes.

3. In a friction shock absorber, the combination with a friction casing; of a plurality of friction shoes slidingly telescoped within the casing; a spring follower in wedging engagement with said shoes, said spring follower having a central bore; a plunger slidable in said bore, said plunger being in shouldered engagement with the shoes; spring means within the casing bearing on said plunger to yieldingly oppose inward movement of the latter; and additional spring means within said casing bearing on said spring follower for yieldingly opposing inward movement of the latter.

4. In a friction shock absorber, the combination with a friction casing; of a plurality of friction shoes slidingly telescoped within the casing; a spring follower ring; cooperating wedge faces on said ring and shoes; a spring within the casing bearing on said ring to oppose inward movement of the latter; a plunger extending through said ring and buttressed at its outer end against said shoes; and a second spring bearing on said plunger to oppose inward movement of the latter.

5. In a friction shock absorber, the combination with a friction casing; of a plurality of friction shoes slidingly telescoped within said casing, said shoes having laterally inwardly projecting flanges thereon at their outer ends; a follower ring in wedging engagement with said shoes; a plunger slidable in said ring and bearing at its outer end on the flanges of said shoes; a spring within the casing bearing on said plunger and yieldingly opposing inward movement of the same; and a second spring within the casing bearing on said follower ring and yieldingly opposing inward movement of the same.

GEORGE E. DATH.

REFERENCES CITED

The following references are of record in the file of this patent:

UNITED STATES PATENTS

| Number | Name | Date |
|---|---|---|
| 1,002,498 | Symington | Sept. 26, 1911 |
| 1,941,787 | Clark | Jan. 2, 1934 |
| 2,156,779 | Duryea | May 2, 1939 |
| 2,159,457 | Sproul | May 23, 1939 |
| 2,417,410 | Gray | Mar. 18, 1947 |